United States Patent [19]

Helkenberg

[11] Patent Number: 5,071,106
[45] Date of Patent: Dec. 10, 1991

[54] APPARATUS FOR THE OPTO-ELECTRONIC CONTROL OF A FLAME CUTTING MACHINE

[75] Inventor: Rolf Helkenberg, Seligenstadt, Fed. Rep. of Germany

[73] Assignee: ESAB-Hancock GmbH, Karben, Fed. Rep. of Germany

[21] Appl. No.: 581,717

[22] Filed: Sep. 13, 1990

[30] Foreign Application Priority Data

Sep. 13, 1989 [DE] Fed. Rep. of Germany ....... 3930610

[51] Int. Cl.$^5$ ............................................... B23K 7/10
[52] U.S. Cl. ..................................... 266/58; 266/48; 266/76; 266/78
[58] Field of Search ...................... 266/48, 53, 58, 50, 266/76, 78

[56] References Cited

FOREIGN PATENT DOCUMENTS 2203194 1/1972 Fed. Rep. of Germany .

Primary Examiner—S. Kastler
Attorney, Agent, or Firm—William A. Behare

[57] ABSTRACT

Apparatus for the opto-electronic control of a flame cutting machine having photoelectric sensors of different spectral sensitivity. The sensors may be positioned within a cutting torch and directed during operation on a flame and a workpiece to be cut. The sensors are connected at their outputs with computing means to generate control signals for the advancing movement of the cutting torch relative to the workpiece. In order to reduce the impact of disturbing variables on the control signals, an electronic means for generating the quotient of the sensor output signals is connected with the outputs of at least two of said sensors. The quotient of the output magnitude of the sensors is used to control the flame cutting machine.

20 Claims, 8 Drawing Sheets

APPARATUS FOR THE OPTO-ELECTRONIC CONTROL OF A FLAME CUTTING MACHINE

BACKGROUND OF THE INVENTION

1. Field of the Invention

The present invention relates to an apparatus for the optoelectronic, or electrical, control of a flame cutting machine and, more specifically, to a flame cutting machine that employs light wavelength sensitive elements for monitoring and controlling several different phases of a flame cutting process.

2. Background Information

A method to continuously control a gas, or flame, cutting process by the employment of a photoelectric element directed onto the cutting flame, is known. The method monitors whether a change of the brightness of a portion of the gas cutting flame, including the oxidizing reaction, occurs through the monitoring of the photoelectric element. That method is disclosed in German Auslegeschrift No. 2,203,194. With that method, the gas cutting process is adjusted by automatically controlling the cutting speed and by stopping the cutting apparatus if, for example, a misfire occurs.

To implement that method, the photoelectric element is positioned at an upper end of a burner. The flame is monitored through a central bore provided for the cutting oxygen in the burner and through a channel provided in the cutting nozzle of the burner. The photoelectric element is directed onto the brightly glowing portion of the flame when positioned in this manner.

The cutting speed is continuously controlled by detecting whether a change of the output voltage of the photoelectric element occurs within a predetermined range. However, with this apparatus and method, only one criterion, i.e the change of the brightness of the portion of the oxidizing reaction gas cutting flame, is detected to control the cutting speed and to stop the gas cutting process in case of misfire.

In order to increase in the efficiency of the method, or process and to save material, it has been proposed to separately record and assess the temperature of the flame, the ignition temperature of the material to be cut and the temperature of the front cutting face. To accomplish that, a signal corresponding to the flame temperature is analyzed for the control of the gas flow, a signal of the ignition temperature of the metal is analyzed for the control of the cutting oxygen and for the movement of the beam and a signal of the temperature of the front cutting face is analyzed for determining when an interruption of the cutting process should occur In an attempt to accomplish this process by opto-electronic control, a photo generator or photo cells, are positioned in the burner that has a channel for cutting oxygen. The photo generator comprises three individual photoelements, or photo cells, that independently are connected with a computing device. The photoelements exhibit different spectral sensitivity. A first photoelement is connected with a control system for the flow of the gas and for a co-ordinate drive system. The optical characteristic, or sensitivity, of that photoelement are selected to correspond to and monitor the temperature of the flame.

A second photoelement is connected with a system for controlling the flow of the cutting oxygen and for controlling the co-ordinate drive system. The optical characteristics of the second photoelement are selected to correspond to and monitor the ignition temperature of the metal, or material, to be cut.

A third photoelement is, also, connected with the system for controlling the flow of the cutting oxygen and for controlling the co-ordinate drive system. The optical characteristics of the third photoelement are selected to correspond to and monitor the temperature of the front cutting face of the metal, or material, to be cut.

The purpose of individually selecting the optical characteristics of the three photoelements is to maximize the sensitivity thereof in relation to the optical phenomenon detected by each photoelement. In other words, the characteristics of each photoelement are individually chosen to correspond to the characteristics of the item being monitored. Such characteristics may include color or wavelength of light, intensity of light and the spectrum of light.

However, an analysis of the amplitude of the output of the signals of the photoelements is performed, i.e. as to the brightness of the flame, the workpiece, or the cutting face, within the spectral sensitivity range of each, respective photoelement. Further, the output of each photoelement is analyzed independently from the output of the other photoelements.

The analysis of the amplitudes of the output signals of the photoelements does not, however, provide unambiguous evidence regarding, for example, the flame being monitored when the attainment of the ignition temperature occurs or when the attainment of the cutting of the burner occurs, since the amplitudes of the output signals of the photoelements are subject to strong interferences. Changes, due to interference, of the amplitude levels of the output of the photoelements occur, for example, when a nozzle is changed, when the height of the burner above the workpiece is changed and when the cutting speed is varied.

OBJECT OF THE INVENTION

It is, therefore, one object of the present invention to provide an apparatus that generates signals from photoelectric sensors that automatically provide unambiguous data for the generation of control and monitoring signals, for a flame cutting machine, that are not subject to adulterating interferences, or disturbing variables. Another object of the present invention is to provide a compact arrangement of the photoelectric sensors within the cutting torch.

The present invention provides these objects.

SUMMARY OF THE INVENTION

The present invention provides a pair of photoelectric sensors of different spectral sensitivity. That is each of the pair of the photoelectric sensors provides a specific output signal based on the wavelength of light received. Further, the two signals are analyzed relative to one another to monitor several characteristics, or phases, of the flame cutting process. That is in contrast to the prior art wherein one of a plurality of photoelectric sensors, each of different spectral sensitivity, are provided and the output magnitudes of each sensor are separately analyzed. With such prior art devices, each photoelectric sensor is assigned to monitor one specific aspect of the cutting torch.

With the present invention, however, all processes of interest are detected by the one pair of photoelectric sensors. The output signal of each photoelectric sensor is then processed through logarithmic amplifiers and the output from one amplifier is then electronically subtracted from the output of the other amplifier. The resultant signal, thus, is the quotient of the original two original signals since the difference between the logarithms of two original signals is the quotient of the original two signals.

The output signals from the photoelectric sensors are, therefore, no longer a measure of the brightness of the light detected by the photoelectric sensors, as in the prior art. Rather, the output of the photoelectric sensors correspond to the color temperature, or wavelength, of light and provide an output proportional thereto. Consequently, effects which have an influence on the amplitudes of the output signals generated by photoelectric sensors have no interfering effect on the output signals of the present invention and the evaluation thereof.

In order to obtain unambiguous control and monitoring signals for the different phases or states that are evaluated, the computing device that receives the quotient of the output of the magnitudes of the sensors is provided with discriminators for different assessment, or evaluation, ranges of the quotient. Each particular assessment range may be activated by an external control command. With that arrangement one assessment range is assigned to each phase of the flame cutting process so that, from the wavelength of the light received by the sensors and the formation of the quotient of the two outputs of the sensors, unambiguous data regarding that particular phase may be obtained that may be used for further control of the flame cutting process. The phases, or assessment ranges, monitored may include the burning or preheating of the flame, the preheating of the workpiece and the cutting process itself, including the monitoring and possible control of the cutting oxygen supply. Depending on the intended application area of the apparatus, these and, if necessary, further phases can be determined by using a discriminator that can be associated with the computing means.

Generators are provided for the external control command for activating the discriminators or the assessment ranges in the computing means. Such generators generate control commands for igniting the flame, for preheating the workpiece and for cutting with the supply of cutting oxygen. Such generators, as a rule, constitute part of the basic equipment of the control system of a flame cutting machine so that they are not provided solely for use with the present invention and, therefore, they do not raise the costs in connection with the present invention. Therefore, such generators, also, have rather a novel, additional function when employed with the present invention. Such generators and their use are well known to those skilled in the art.

An opto-double diode, on a common substrate, may be provided and is particularly suited for housing the photoelectric sensors in the heat of the burner. Also, it is especially suited because of its compactness. The diodes of the opto-double diode provide different maximum output signals depending on the wavelength of light detected. Such a monolithic double diode is known under the trade name, or mark, PD 153, of Sharp of Japan. It comprises substantially two diodes of different wavelength, spectral sensitivities, each having an anode terminal and one common cathode terminal. The two anode terminals and the common cathode terminal lead out from the double diode. The maximum light sensitivity output of one diode is somewhat below 600 nm, which may be 600 nanometers, while the maximum light sensitivity output of the other diode is about 900 nm. The combination of two sensors having the above-referenced different spectral sensitivities results in a relatively large assessable range of the light wavelength received.

In one embodiment of the present invention, similar opto-diodes, i.e. diodes having generally identical spectral sensitivity, can be used if one of the two opto-diodes is positioned in a reflective beam path and the other of the two opto-diodes in a transmission beam path of a partly permeable mirror that exhibits spectrally different reflection and transmission characteristics. That is, the mirror transmits more light than it reflects when the wavelength of the light is within a first range and it reflects more light than it transmits when the wavelength of the light is within a different range than the first. In connection with the present application, the mirror may, preferably, be provided to allow to transmit and reflect the identical amount of light at a light wavelength of about 700 nm. 700nm would then be considered the "50% edge" of the mirror.

In another embodiment, the two opto-diodes may consist of separate opto-diodes, each having different spectral characteristics, or sensitivity. An optical germanium diode and a silicon diode may, in particular, be provided.

In all embodiments it is important to note that, because of the calculation of the quotient of the output magnitudes or output signals of the two sensors, the resultant signal is independent of the absolute amount, or intensity, of light to which the two sensors are exposed. Rather, the signal is dependent only on the wavelength of the light received.

The electronic means for calculating the quotient of the two signals may include a subtractor for calculating an approximation of the quotient. The subtractor may receive the two logarithms of the signals from logarithmic amplifiers that convert the output signals of the sensors to logarithmic signals for precise calculation of the quotient. The calculated quotient signal may then be compared to a fixed reference signal through a comparator that may be a discriminator. The comparator may then provide an output signal having a value that is dependent upon whether the quotient signal is above or below a boundary reference signal that is representative of a predetermined boundary wavelength of light. The reference signal to the comparator may be a voltage signal.

Also, a pair of comparators may be provided with one comparator set to one light wavelength boundary reference value and the other comparator set to a second light wavelength boundary reference value. The two boundary reference values establish a nominal range of values corresponding to a nominal range of wavelengths of light. An output signal would then be generated having a value that is dependent upon whether the quotient signal is within or out of the range of values. The output signal may then be used to control the various phases or states of the flame cutting process. Also, a plurality of pairs of comparators may be employed with each pair of comparators set to a different nominal range. Each pair of comparators may then be employed to control a different phase or stage of the flame cutting process. Also, some of the pairs of comparators may generate signals that are used to monitor, rather than control, the cutting process. The output signals of each pair of comparators are connected through a logic element in order to generate the control or monitoring signals. The boundaries of the nominal range may be adjusted by altering the reference signals, or reference voltages, at the comparators, thereby providing an individual adjustment of the upper and lower boundaries.

The present invention may be employed for monitoring a plurality of cutting torches of a flame cutting machine. With this embodiment of the invention, it is not necessary for each pair of photoelectric sensors to have a complete computing device, including discriminators or window comparators for the individual evaluation ranges assigned to it. Rather one set of discriminators or window comparators may be employed in a time multiplex process and, thus, the one set of discriminators or comparators may be time-shared for all pairs of sensors. The present invention not only includes multiplexers at the input and the output of the computing means but, also, an addressable register which assigns the control and monitoring signals generated in the computing means to the individual cutting torches in a preprogrammed sequence.

One aspect of the invention resides broadly in a flame cutting machine for cutting a workpiece comprising a flame generator for generating a flame to cut the workpiece, a flame mover in communication with the flame generator for moving the flame about the workpiece and a flame controller in communication with the flame generator and the flame mover for controlling the flame. The flame controller includes a first sensor for sensing the wavelength of light emitted from at least one of the flame and the workpiece and generating a first signal having a first value corresponding to the wavelength of sensed light. The first signal has a maximum first value when a wavelength of light having a second value is sensed by the first sensor. A second sensor for sensing the wavelength of light emitted from at least one of the flame and the workpiece and generating a second signal having a third value corresponding to the wavelength of sensed light is also provided. The second signal has a maximum third value when a wavelength of light having a fourth value is sensed by the second sensor. The second value is different from the fourth value. A signal processor in communication with the first sensor and the second sensor is provided for receiving and processing the first value of the first signal and the third value of the second signal and generating a third signal having a fifth value corresponding to the quotient of the first value of the first signal and the third valve of the second signal. The third signal is provided for controlling the flame.

Another aspect of the invention resides broadly in a controller for a flame cutting machine for cutting a workpiece comprising a first sensor for sensing the wavelength of light emitted from at least one of the flame and the workpiece and generating a first signal having a first value corresponding to the wavelength of sensed light. The first signal has a maximum first value when a wavelength of light having a second value is sensed by the first sensor. A second sensor is provided for sensing the wavelength of light emitted from at least one of the flame and the workpiece and generating a second signal having a third value corresponding to the wavelength of sensed light. The second signal has a maximum third value when a wavelength of light having a fourth value is sensed by the second sensor. The second value is different from the fourth value. A signal processor in communication with the first sensor and the second sensor is provided for receiving and processing the first value of the first signal and the third value of the second signal and generating a third signal having a fifth value corresponding to the quotient of the first value of the first signal and the third valve of the second signal. The third signal for controlling the flame.

Yet another aspect of the invention resides broadly in a controller for controlling the flame of at least first and second flame cutting torches for cutting an object. The controller includes a first sensor for sensing the wavelength of light emitted from at least one of the flame of the first torch and the object. The first sensor generates a first signal having a first value corresponding to the wavelength of sensed light. The first signal has a maximum first value when a wavelength of light having a second value is sensed by the first sensor. A second sensor is provided for sensing the wavelength of light emitted from at least one of the flame of the first torch and the object. The second sensor generates a second signal having a third value corresponding to the wavelength of sensed light. The second signal has a maximum third value when a wavelength of light having a fourth value is sensed by the second sensor. The second value being different from the fourth value. A third sensor is provided for sensing the wavelength of light emitted from at least one of the flame of the second torch and the object. The third sensor generates a third signal having a fifth value corresponding to the wavelength of sensed light. The third signal has a maximum fifth value when a wavelength of light having a sixth value is sensed by the third sensor. A fourth sensor is provided for sensing the wavelength of light emitted from at least one of the flame of the second torch and the object. The fourth sensor generates a fourth signal having a seventh value corresponding to the wavelength of sensed light. The fourth signal has a maximum seventh value when a wavelength of light having an eighth value is sensed by the fourth sensor. The sixth value is different from the eighth value. A first multiplexer is connected to the first, second, third and fourth sensors for selectively receiving one of: a) both the first and second signals, and b) both the third and fourth signals. A processor is connected to the first multiplexer for generating first and second processed signals corresponding to one of: a) both the first and second signals, and b) both the third and fourth signals. A first comparator is connected to the processor further processing the first and second processed signals into third and fourth processed signals, comparing the third processed signal to a first reference signal, generating a first output signal if the third processed signal is greater than the first reference signal, comparing the fourth processed signal to a second reference signal, generating a second output signal if the fourth processed signal is less than the second reference signal and generating a first comparator signal if both the first output signal and the second output signal have been generated.

BRIEF DESCRIPTION OF THE DRAWINGS

The present invention may be better understood when taken in conjunction with the appended drawings in which:

FIG. 2 is a schematic diagram of the sensors, of FIG. 1, in the form of a monolithic opto-double diode with each sensor being of different spectral sensitivity;

DESCRIPTION OF THE PREFERRED EMBODIMENTS

Figure 1:
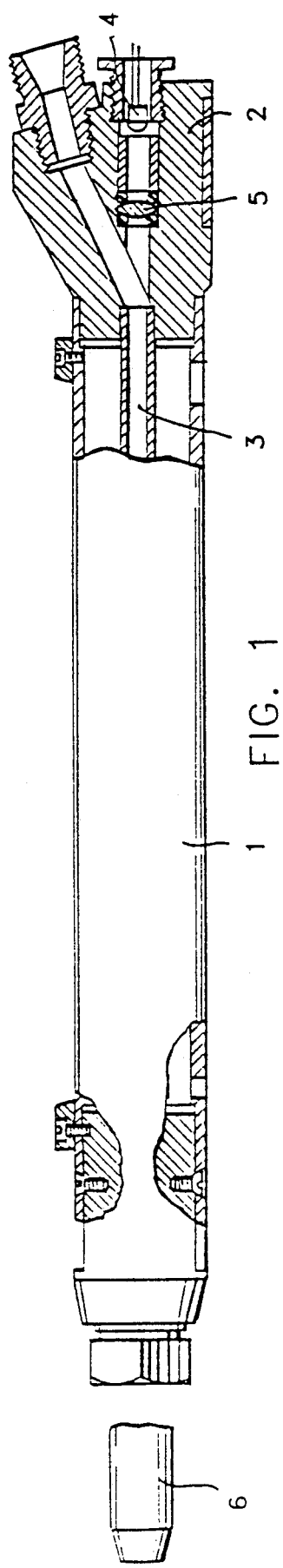
FIG. 1 is a side elevational view, partially in section, of a cutting torch in which photoelectric sensors are positioned.

Cutting torch 1 is shown in FIG. 1. Connecting portion 2, of the cutting torch 1, is shown in section. Opto-double diode 4 is positioned in the elongated opening of cutting oxygen channel 3 in connecting, or head, portion 2. Image-forming lens 5 is positioned adjacent diode 4. Lens 5 is provided for focusing an image in the area in front of, or under, the opening of nozzle 6 on opto-double diode 4 and may be any standard optical lens capable of focusing light at a desired location. The focusing area of interest is the flame that emerges from nozzle 6 during the operation of cutting torch 1 or the part of the workpiece (not shown) to be processed or cut and that will be positioned adjacent nozzle 6.

FIG. 2 shows a schematic of a light receiving monolithic opto-double diode that comprises first diode 7 and second diode 8. Diodes 7 and 8 have common cathode terminal 9, that is connected to and connects together the cathodes of both diodes 7 and 8. Anode terminals 10 and 11 are also provided for connecting to the anodes of diodes 7 and 8, respectively.

Figure 3:
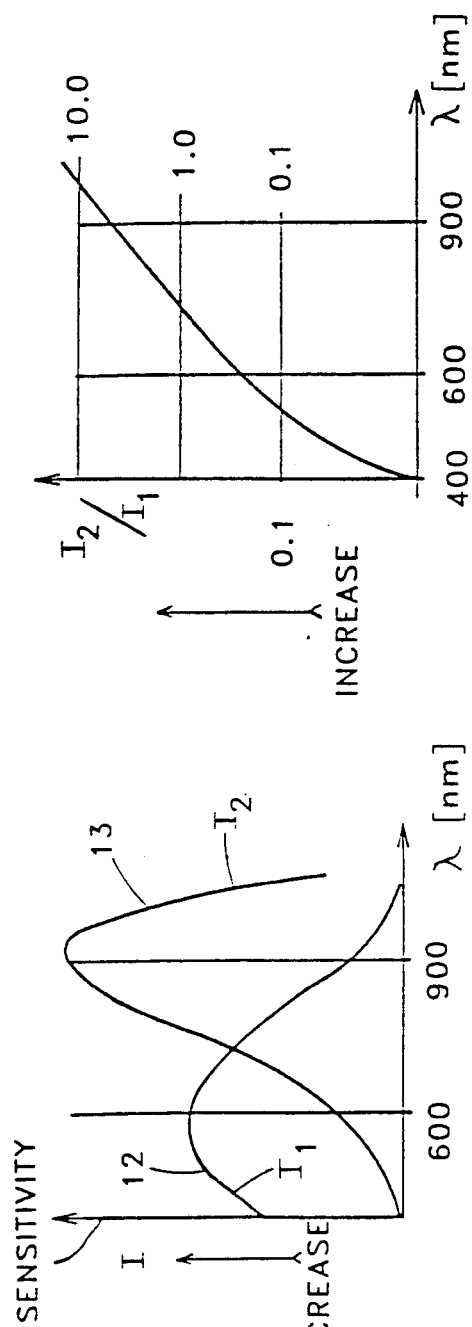
FIG. 3 is a graph of typical sensitivity v. light wavelength characteristics of the spectral sensitivity of the two diodes of the opto-double diode of FIG. 2.

In FIG. 3, the relative spectral sensitivity of first diode 7 having current output curve 12, and second diode 8, having current output curve 13, are shown as a function of the wavelength of the light impinging on each diode. The currents shown at each wavelength represent the short circuit currents for each diode, wherein $I_1$ represents the short circuit current of diode 7 while $I_2$ represents the short circuit current of diode 8. The absolute magnitudes of each diode 7 and 8 may vary depending on the particular model of diode used. Such absolute magnitudes may be determined with reference to standard electronic publications well known in the art. For the purposes of this invention, it is the relative values of the output currents that are important, rather than their absolute magnitudes. FIG. 3 shows that first diode 7, having curve 12, provides a maximum output near the wavelength of 600 nm while second diode 8 having curve 13, provides a maximum output near 900 nm.

Figure 4:
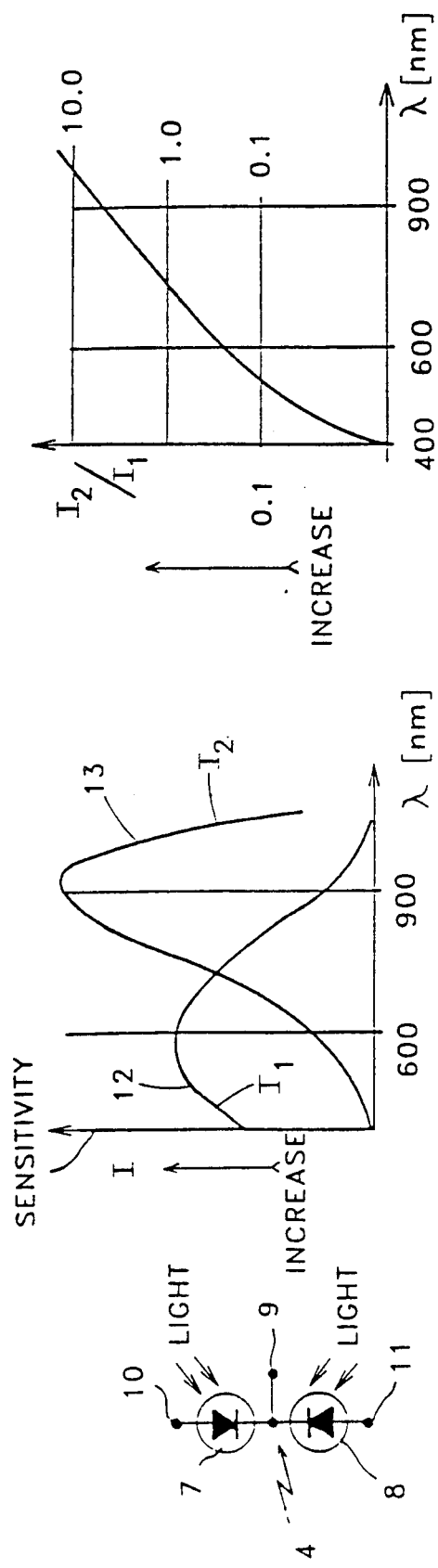
FIG. 4 is a graph of the ratio of the output magnitudes of the output currents of the two diodes of FIG. 2 v. wavelength of the light.

FIG. 4 shows the ratios of the short circuit current outputs of second diode 8 to first diode 7 as a function of the wavelength of light received by each diode. It can be seen that the ratios of the output currents, or the output magnitudes, of the two diodes varies in relation to the wavelength of light received by the diodes.

Figure 5:
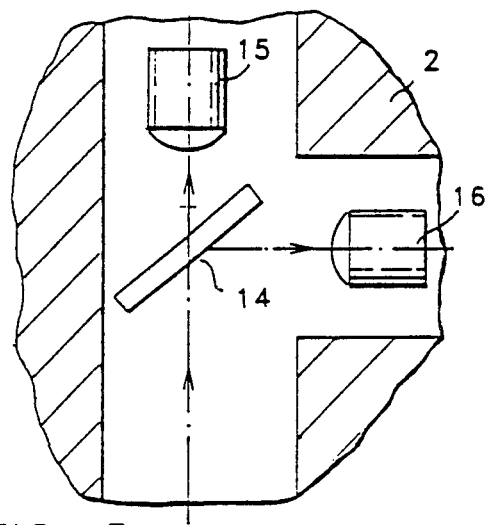
FIG. 5 is a schematic view of an arrangement of sensors, positioned within a cutting torch, that receives light from a partially light permeable mirror.
Figure 6:
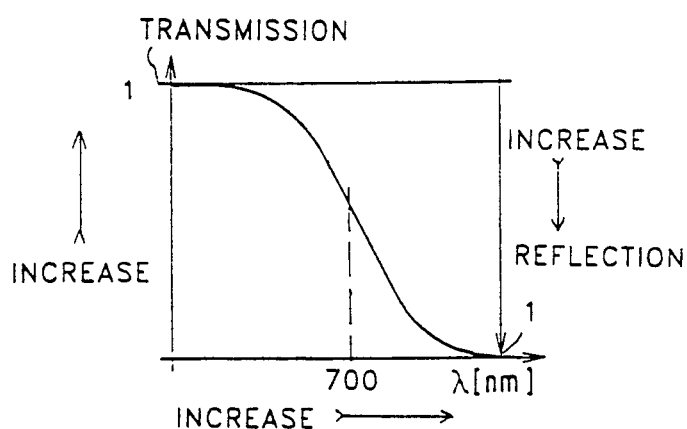
FIG. 6 is a graph of typical transmission-reflection characteristics of the mirror of FIG. 5.

Instead of opto-double diode 4, a sensor arrangement as shown in FIG. 5 may be provided in connecting, or head, portion 2 of cutting torch 1. However, a larger space in the lead position, or head portion 2 is needed than with the previously described arrangement employing diodes 7 and 8. The sensor arrangement, as shown in FIG. 5, comprises partly permeable mirror 14 that is positioned in the transmission beam path of first opto-diode 15 and in the reflection beam path of second opto-diode 16. The transmission-reflection characteristics of partly permeable mirror 14 are shown in FIG. 6. Thus, as the wavelength of light impinging on the mirror 14 increases, the transmission of the mirror decreases and the reflection of the mirror increases. The "50% edge" at which an equal amount of light is passed and reflected by mirror 14 lies at about 700 nm. The longer the wavelength light, the more that is reflected and the lens that is transmitted.

Thus, the outputs of diodes 15 and 16 vary relative to the wavelength of light impinging on mirror 14 as do the outputs of diodes 7 and 8 relative to the wavelength of light impinging on opto-double diode 4. Therefore, the diode arrangement shown in FIG. 2 and that shown in FIG. 5 each provide two current signals having different short circuit output current characteristics that are, each, functions of light wavelength.

Figure 7:
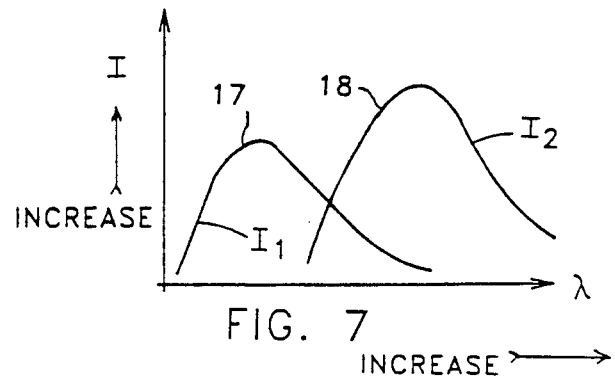
FIG. 7 is a graph of the output magnitudes of the output currents of the sensors of FIG. 5.

FIG. 7 shows the short circuit current outputs of opto-diodes 15 and 16, according to curves 17 and 18, respectively, as a function of the wavelength of light received by mirror 14. Diode 15 has a current output designated as $I_1$ while diode 16 has a current output designated as $I_2$. If the ratio $I_2/I_1$, of opto diodes 16 and 15 is calculated, the resultant graph, or plot, of the ratio v. light wavelength would be similar to that shown in FIG. 4.

Figure 8:
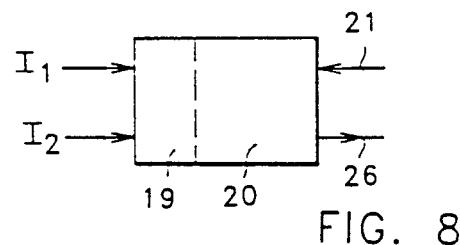
FIG. 8 is a block diagram of a computing device that is employed with the present invention.

An analysis of the output magnitudes of opto-diodes 15 and 16 or opto-double diode 4 may, generally identically, be performed by computing device 20, as shown in FIG. 8. It should be noted that with the mirror-diode arrangement of FIG. 5, mirror 14 performs the analysis of the wavelength of light impinging thereon and passes or reflects light whose intensity varies as a function of light wavelength received. Thus, diodes 15 and 16 provide output currents that vary in relation to the intensity of light passed from mirror 14 since the intensity of light passed from or reflected by mirror 14 varies relative to the wavelength of light received by mirror 14. Therefore, the output current magnitudes of diodes 15 and 16 corresponds to the wavelength of light received by the sensor arrangement, as a whole, as does the sensor arrangement of FIG. 2.

Irrespective of whether the output currents $I_1$ and $I_2$ of opto-diodes 15 and 16 are to be analyzed, or the output currents of opto-double diode 4 are to be analyzed, the output currents are directed to quotient former 19 which calculates at least an approximation of the ratio or quotient of the two currents. That quotient, as shown in FIG. 4, provides an indication of the light wavelength received by the diodes. In order to form unambiguous control or monitoring signals from that quotient, the quotient is differentiated, or analyzed, in computing device 20, in accordance with the specific operational phase, including the preparatory phase of flame cutting, that is being monitored by the actual light wavelength measurement.

Control commands that are generated for igniting the preheating flame, for controlling the progress of the preheating process and for the initiation of the cutting by the flow of cutting oxygen in a common control device of a flame cutting machine, are fed to computing device 20 through control input 21. Discriminators in computing device 20 (not shown in FIG. 8 but discussed later) provide a selection of the actual assessment range for the respective operational phases. By doing so, an unambiguous calculation of the quotient of currents $I_1$ and $I_2$ is possible. This is shown graphically in FIG. 9.

Figure 9:
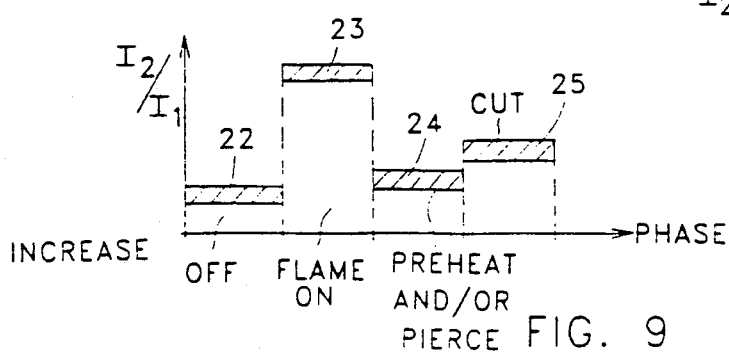
FIG. 9 is a graph of the assessment ranges of the ratios of the output magnitudes of the output currents of the sensors of the present invention v. the phase of the process to be performed.

On the ordinate axis of FIG. 9, the different operational phases of the flame cutting machine or cutting torch 1 have been labeled as: "Off", "Flame on", "Preheat" or "Pierce Hole" and "Cut." Each of these phases is assigned one of assessment ranges 22, 23, 24 and 25, respectively. The internal shaded portion of each assessment range represents a nominal, acceptable range of the quotient $I_2/I_1$, during which a signal may be provided to indicate the orderly and proper functioning of cutting torch 1 during each, respective, operational phase. Output 26 of computing device 20, thus, generates control and monitoring signals that indicate whether cutting torch 1 is off, whether the preheating flame is burning, whether the ignition temperature has been reached and whether cutting torch 1 is cutting. If the actual monitored quotient, $I_2/I_1$, is outside of the shaded portion of a specifically selected phase, then the torch system is not operating to specification.

Figure 10:
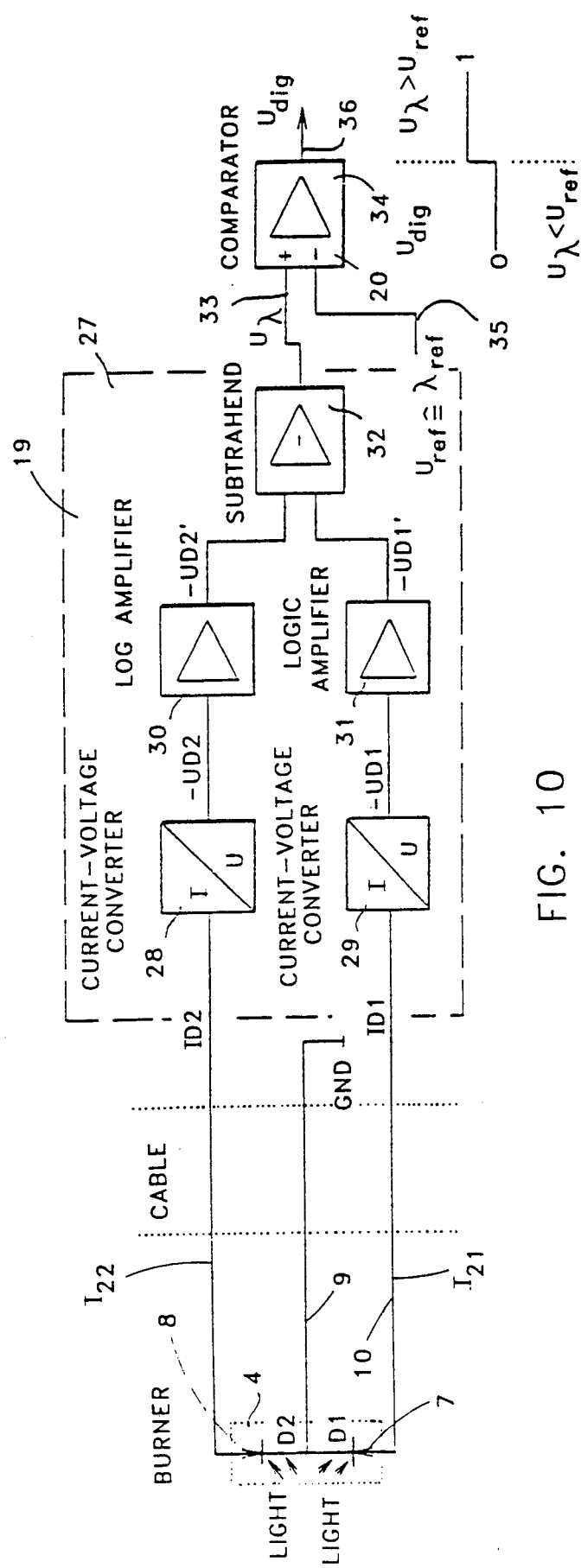
FIGS. 10 through 13 are block diagrams showing various configurations of flame cutting machine monitoring and control devices employing the present invention.

A first embodiment of electronic quotient former 19 and of computing device 20 is shown in FIG. 10. Components in any one drawing figure that are identical to those of one or more other figures are designated by identical reference numerals throughout. Each of currents ID1 and ID2 correspond, respectively, to currents $I_1$ and $I_2$ in the preceding Figures. Those signals, for example, may be generated by opto-double diode 4, or the diode arrangement shown in FIG. 5, and then fed into circuit portion 27 that is defined by the broken lines of the circuit arrangement. Currents ID1 and ID2 are converted by current-to-voltage converters 29 and 28, respectively, into a proportional voltage that is, subsequently, amplified by logarithmic amplifiers 31 and 30, respectively. The voltage, amplified in accordance with the logarithmic characteristics of amplifiers 30 and 31 are subtracted from each other in subtractor 32. The output voltage of subtractor 32 is, thus, approximately the quotient ID2/ID1 of the input currents ID1 and ID2 and, hence, is a measurement of the light wavelength received by opto-double diode 4. That is because the difference between the logarithms of two original signals, such as ID2 and ID1, represents the quotient, ID2/ID1, of the two original signals. Circuit portion 27 of FIG. 10, therefore, represents one actual embodiment of quotient former 19, of FIG. 8.

The output voltage of circuit portion 27, that is the output voltage of subtractor 32, is fed to input 33 of comparator 34. Input 35 of comparator 34 is supplied with a reference voltage that is determined on a case-by-case basis for each particular application of use of the cutting torch system. Comparator 34 differentiates whether the voltage corresponding to the light wavelength at input 33 is above or below the reference voltage at input 35 and provides a control or monitoring signal at output 36 that varies depending on the results of the comparison of the two signals. In this embodiment, comparator 34 represents one actual embodiment of computing device 20.

Figure 11:
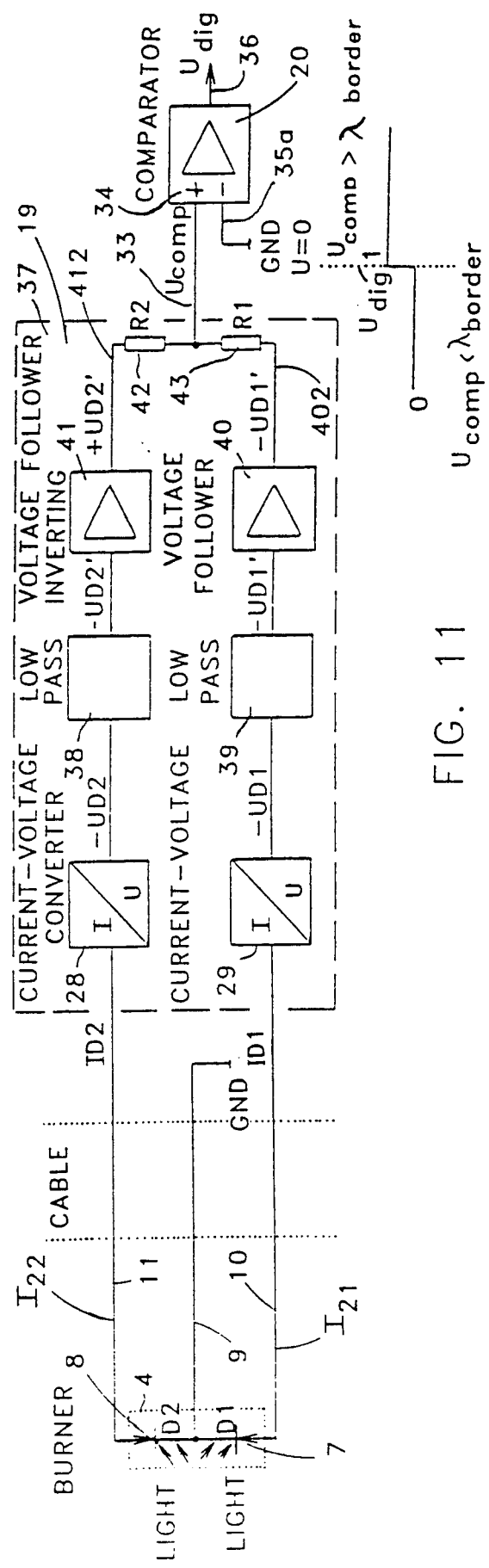

A second embodiment of the present invention is shown in FIG. 11. The embodiment shown in FIG. 11 differs from the embodiment shown in FIG. 10 by input 35a which is grounded and circuit portion 37, which comprises quotient former 19. Current-to-voltage converters 28 and 29, each, are followed by smoothing low pass filters 38 and 39. The output voltage of filter 39 passes through voltage follower 40 and the output voltage of filter 38 passes through inverting voltage follower 41. Circuit portion 37 also performs the function of converting the signals representing ID1 and ID2 into logarithmic signals at outputs 40a and 41a of voltage follower 40 and inverting followers 41a, respectively. Although such logarithmic conversion may take place in any of the individual components comprising circuit portion 37, it may conveniently be performed in voltage follower 40 for ID1 and inverting follower 41 for ID2. Of course, current-to-voltage converters 28 and 29, as well as low pass filters 38 and 39 could be adapted to provide such logarithmic conversion. Also, amplifiers such as logarithmic amplifiers 30 and 31 could be employed in circuit portion 37 to provide the desired logarithmic conversion that is supplied on outputs 40a and 41a. Irrespective of where such logarithmic conversion is performed, however, outputs 40a and 41a correspond to logarithms of ID1 and ID2.

By coupling outputs 40a and 41a through resistances 42 and 43, the difference between the output voltages, that is the difference between the logarithmic signals, is provided across resistances 42 and 43. That difference represents an approximate calculation of the quotient of the current magnitudes ID1 and ID2 of opto-double diode 4, or as an alternative of the circuit arrangement of FIG. 5, since the difference of the logarithms of the two original signals represents the quotient of the two original signals. That signal representing the quotient $I_2/I_1$, appears at input 33 of comparator 34.

Input 35a of comparator 34 is grounded in this embodiment. The boundary wavelength at which the comparator changes the magnitude of output the 36 is, in this embodiment, determined by the ratio of resistances 42 and 43, which is determined on a case-by-case basis for each particular application of use of the cutting torch system.

Figure 12A:
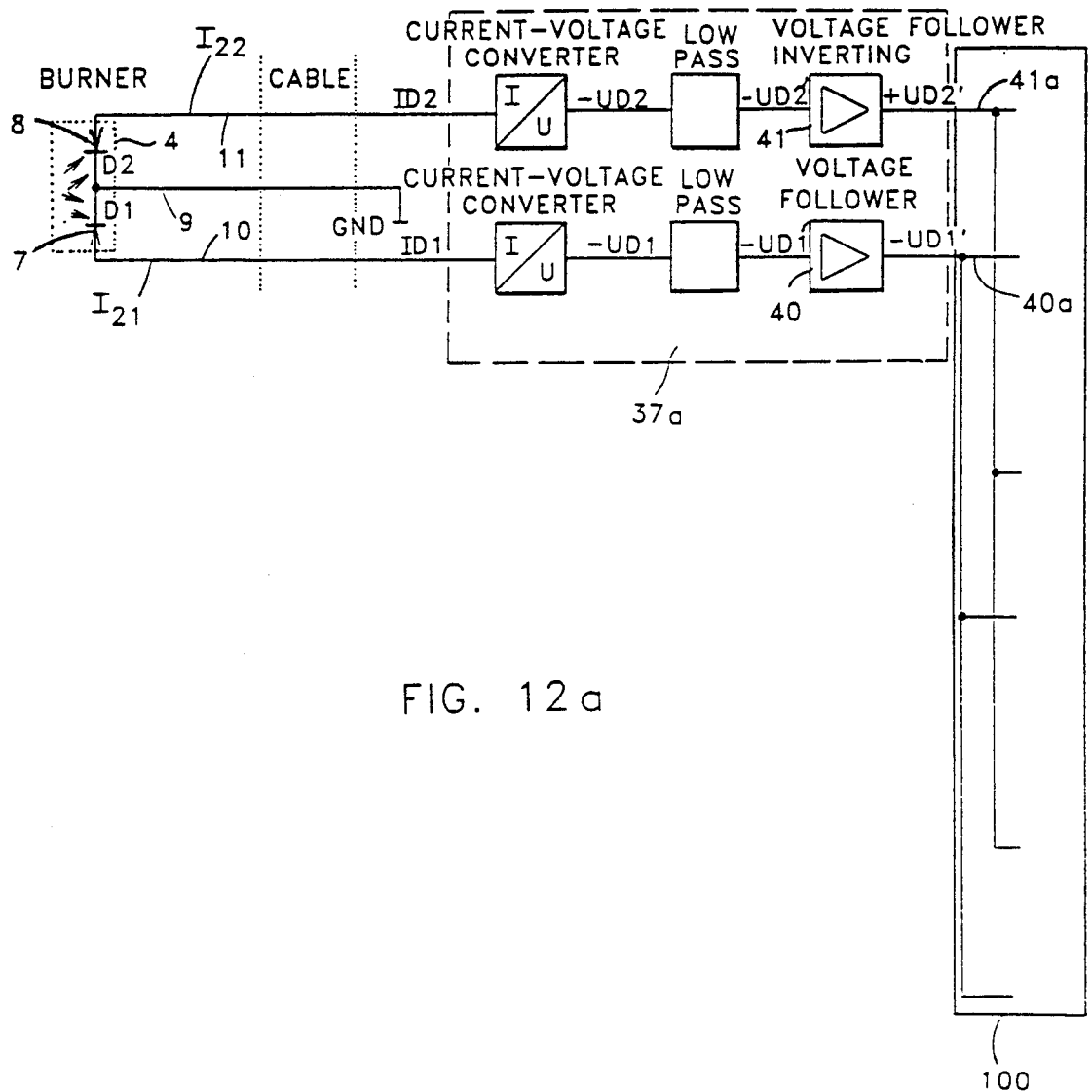
Figure 12B:
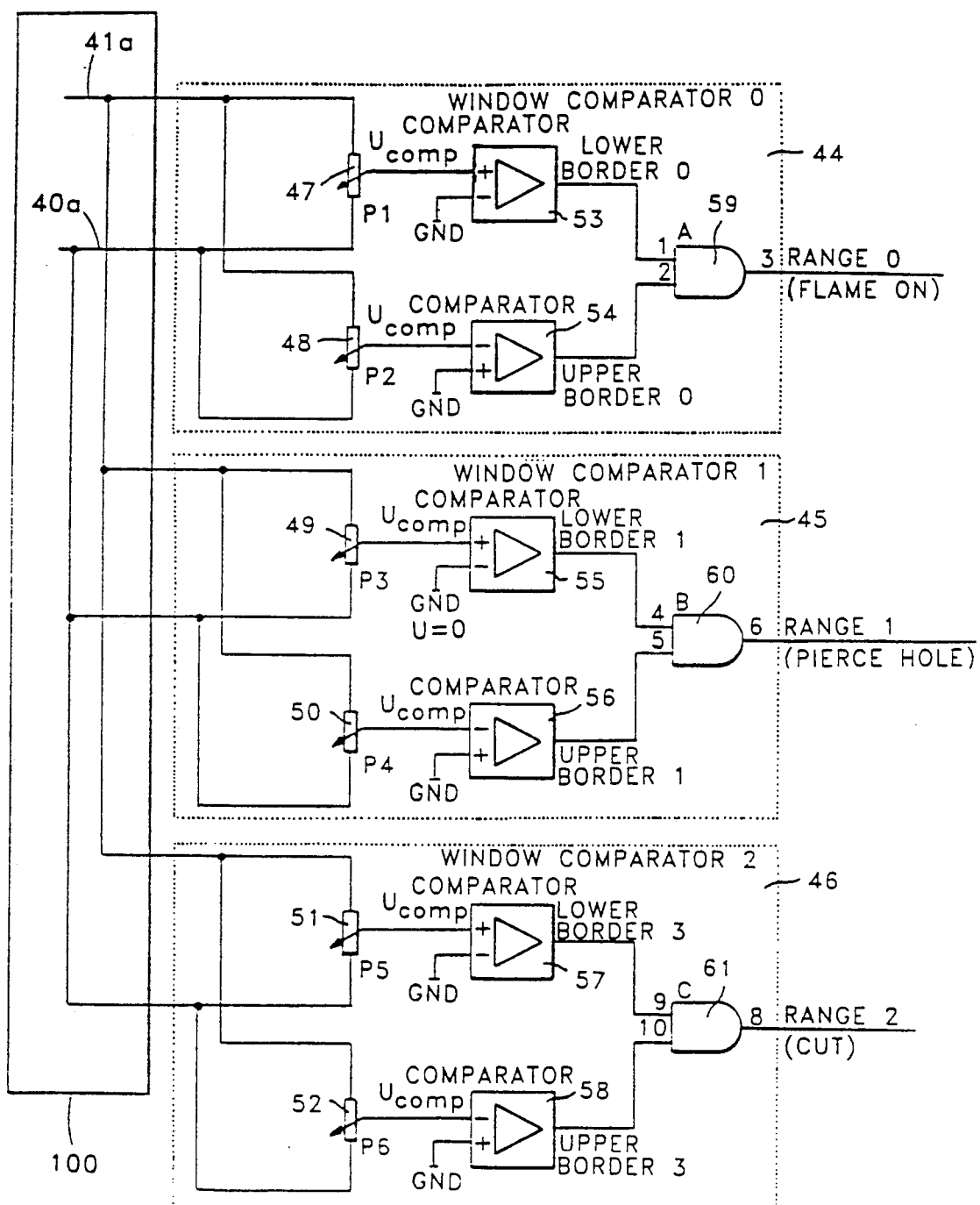

In a third embodiment of the present invention as shown in FIGS. 12a and 12b, in which the portion of the circuit within box 100 of FIG. 12a is reproduced in FIG. 12b for the purposes of continuity between the figures, circuit portion 37a is essentially the same as circuit portion 37 of FIG. 11, with the exception that the subtraction function of subtractor 32, or resistances 42 and 43, is performed outside circuit portion 37a. The outputs of voltage followers 40 and 41 of FIG. 12, that is outputs 40a and 41a respectively which are logarithmic signals corresponding to ID1 and ID2 respectively, are connected through a more complex resistance arrangement than that shown in FIG. 11.

A coupling of two resistances, such as resistances 42 and 43 in FIG. 11, is provided in the third embodiment by one of potentiometers 47 through 52. The slider of each of potentiometers 47 through 52 is connected to one input each of comparators 53 through 58 as shown in FIG. 12. The other input of each of comparators 53 through 58 is at zero potential, or grounded. At each comparator, therefore, in a manner similar to that described in conjunction with FIG. 11, a boundary wavelength can be set where a change of the output signal of each comparator occurs since the position of the slider regulates the relative resistances serially connected to outputs 40a and 41a thereby performing the equivalent function of selecting the values of resistances 42 and 43 in FIG. 11. Such a selection of resistance values is determined on a case-by-case basis for each particular application of use of the cutting torch system.

Pairs of comparators, for example, comparators 53 and 54, 55 and 56 and 57 and 58 have outputs that are coupled together to form window comparators 44, 45 and 46, respectively. The outputs of each of pair of comparators of each of window comparators 44, 45 and 46 is connected to a logic element. Comparators 53 and 54 are connected to logic element 59, comparators 55 and 56 are connected to logic element 60 and comparators 57 and 58 are connected to logic element 61. Logic elements 59, 60 and 61 are, preferably, AND gates.

By assigning one of each pair of comparators, for example comparator 53 which is adjusted by potentiometer 47, of a window comparator to one border of an evaluation range and one comparator, for example comparator 54 which is adjusted by potentiometer 48, to another border of the evaluation range, comparators 53 and 54 work in combination with logic element 59 to form a window comparator, such as 44, that produces an output from logic element 59 only when outputs 40a and 41a of circuit portion 37a are within the two borders.

Window comparator 44 has a window with one upper border and one lower border within which an output signal of logic element 59 assumes a first value and outside of which the output signal assumes a second value. Window comparators 45 and 46 operate in a similar manner. In this way, window comparators 44, 45 and 46 form output signals for the "Off", "Flame on", "Preheat" or "Pierce Hole" and "Cut" phases, respectively. Each of these states or phases corresponds to an assessment or evaluation range, such as is shown in FIG. 9, having the borders adjustable by potentiometers 47 through 52.

Figure 13A:
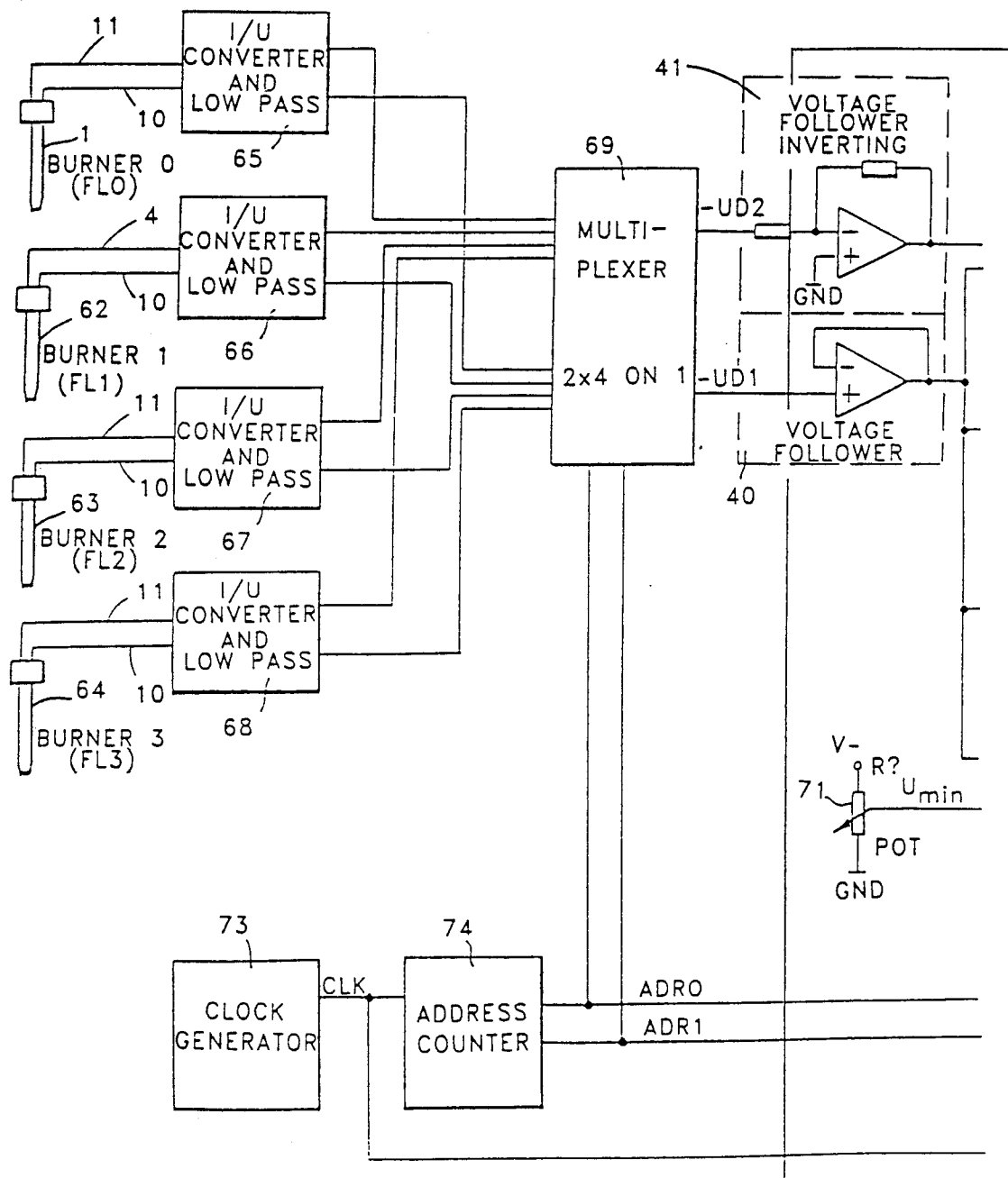
Figure 13B:
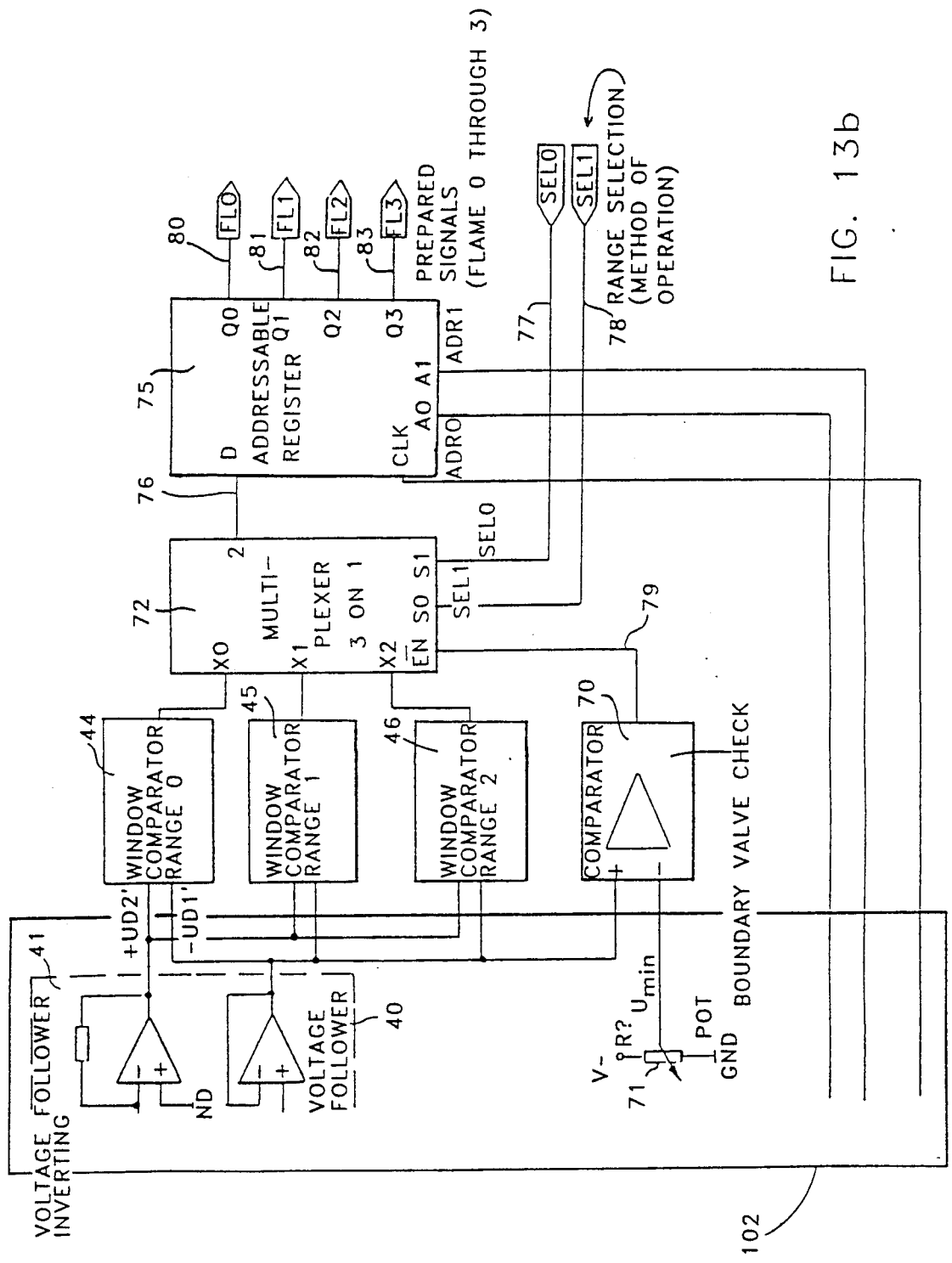

In the embodiment shown in FIGS. 13a and 13b, in which the portion of the circuit within box 102 of FIG. 13a is reproduced in FIG. 13b for the purposes of continuity between the figures, cutting torches 62, 63 and 64, in addition to cutting torch 1, are all being monitored and controlled. As described in conjunction with a single torch, such as torch 1, each of the cutting torches is provided with two sensors of different spectral sensitivity; preferably an opto-double diode such as opto-double diode 4, or the circuit arrangement of FIG. 5. The output currents of the sensors are, again, as described in conjunction with FIG. 11, converted into proportional voltage signals and smoothed by a low pass filter. The current-to-voltage converters and the low pass filter are designated as circuits 65 through 68. Logarithmic conversion of the signals may take place in circuits 65 through 68. It is also possible that logarithmic conversion of the signals may take place in followers 40 and 41. The output signals of circuits 65 through 68 are further processed in a time staggered manner in a multiplex process.

To accomplish this multiplex process the output currents of one opto-double diode, or two diodes of a pair are fed, via first multiplexer 69 to voltage follower 40 as well as inverting voltage follower 41 in a manner similar to that described in conjunction with the embodiment of the invention as shown in FIG. 11. Irrespective of where the logarithmic conversion, or transformation, of the original signals from the opto-double diodes or pairs of diodes occurs, logarithmic signals, representing those original signals, are supplied to window comparators 44, 45 and 46. The evaluation or assessment of the logarithmic output signals of followers 40 and 41 is then made by window comparators 44, 45 and 46 as described in conjunction with the embodiment of the invention shown in FIGS. 12a and 12b.

Additionally, a boundary value check is made by means of comparator 70. One input of comparator 70 is fed from voltage follower 40 and the second input of comparator 70 is adjustable by means of potentiometer 71 to a voltage where switchover occurs. The adjusted resistance value of potentiometer 71 is, thus, used for the boundary value check.

The outputs to be switched over, of window comparators 44, 45 and 46, for the generation of monitoring and control signals of the respective cutting torch monitored, are fed into second multiplexer 72. The switchover of the multiplexers is synchronously controlled by clock generator 73 and address counter 74. Addressable register 75 is connected with second multiplexer 72 by lead 76. Further control of second multiplexer 72 is made depending on the range selection on leads 77 and 78 and by the output signal of comparator 70 on lead 79.

Activation of the evaluation, or assessment, ranges in the last end occurs by second multiplexer 72. The assignment of the selected evaluation, or assessment range to one of cutting torches 1, 62, 63 and 64 is done via addressable register 75. In this way, a plurality of cutting torches, or cutting locations can be monitored and controlled with relatively little effort.

Thus, first multiplexer 69 receives data signals corresponding to one of cutting torches 1, 62, 63 and 64 in a time shared manner so that only one of the cutting torches is being monitored at any given moment. The signals are then processed through voltage follower 40, inverting voltage follower 41 and window comparators 44, 45 and 46 and transferred to second multiplexer 72. Second multiplexer 72 then, in a time shared manner, selects one of ranges corresponding to one of the "Off", "Flame on", "Preheat" or "Pierce Hole" and "Cut" phases for transfer to addressable register 75. Second multiplexer 72 functions such that only one of the signals corresponding to one of the "Off", "Flame on", "Preheat" or "Pierce Hole" and "Cut" phases is transferred to addressable register 75 at any given moment. Addressable register 75 then provides output signals to the control systems of the cutting torches through outputs 80, 81, 82 and 83 for the particular one of the "Off", "Flame on", "Preheat" or "Pierce Hole" and "Cut" phases being controlled by second multiplexer 72 at that particular moment. The remainder of the "Off", "Flame on", "Preheat" or "Pierce Hole" and "Cut" phases are then, each, multiplexed, one at a time, through second multiplexer 72 to addressable register 75. This process is repeated in a time multiplexed manner by multiplexer 69, for each of torches 1, 62, 63 and 64. Thus, the embodiment of the present invention shown in FIG. 13 is capable of monitoring and controlling, in a time-shared manner, each phase of a plurality of cutting torches.

Clock generator 73 and address counter 74 control multiplexers 69 and 72, while the signals on leads 77 and 78 may be selected to provide additional control to second multiplexer 72. The various threshold values, that is the values of the signals that control the switchover of the various comparators, may be selected in accordance with the desired operating characteristics of each cutting torch.

In summary, one feature of the invention resides broadly in an apparatus for the opto-electric control of a flame cutting machine comprising photoelectric sensors of different spectral sensitivity disposed in particular within a cutting torch and directed during operation on a flame and a workpiece to be cut, and connected at the output with computed means in order to generate control signals particularly for the advance movement of the cutting torch relative to the workpiece, characterized in that electronic means 27 for quotient formation are provided which are so connected with the outputs of at least two of said sensors 4, 7, 8 of different spectral sensitivity that the quotient of the output magnitude of the sensors is formed and that the means for quotient formation are connected, at the output, with said computing device 20.

Another feature of the invention resides apparatus which is characterized in that in said computing means discriminators (window comparators 53-58) for different assessment ranges of the quotient of the output magnitudes of the sensors have been provided one assessment range of which each may depending on the occurrence of an external control command be activated.

Yet another feature of the invention resides broadly in an apparatus which is characterized in that generators of said external control commands for igniting the flame, for preheating the workpiece and for cutting are connected with said assessment means 20 and that in said computing means discriminators for one ignition range, one preheating range and one cutting range of the quotion of the output magnitude of the sensors are provided.

A further feature of the invention resides broadly in an apparatus which is characterized in that said sensors of different spectral sensitivity are formed by an opto-double diode 4 on a common substrate, wherein diodes 7, 8 of said double diode depending on the light wavelength exhibit different sensitivity maxima.

A yet further feature apparatus according to one of claims 1 through 3, characterized in that said sensors of different spectral sensitivity comprise two similar opto-diodes 15, 16 one opto diode 16 each of which is arranged in a reflection beam path and one opto diode 15 in the transmission beam path of a partially permeable mirror 14 and that said partially permeable mirror exhibits spectrally different reflection and transmission.

Yet another further of the invention resides broadly in an apparatus which is characterized in that the sensors of different spectral sensitivity each comprise a separate opto diode of a different spectral characteristic (sensitivity).

An additional feature of the invention resides broadly in an apparatus which is characterized by an optical germanium diode and silicon diode each as sensors of different spectral sensitivity.

A yet additional feature of the invention resides broadly in an apparatus which is characterized in that said electronic means for quotient formation are realized by at least one subtrahend 32 in which the quotient of the output magnitudes of said sensors of different spectral sensitivity is formed as an approximation.

A further additional feature of the invention resides broadly in an apparatus which is characterized in that in front of each of two inputs of said subtrahend 32 one logic amplifier 30, 31 is arranged which is loaded with one of said output magnitudes each of said sensors of different spectral sensitivity.

A yet further additional feature of the invention resides broadly in an apparatus which is characterized in that in said computing means at least one comparator 34 is provided as discriminator which generates one defined output signal each depending on whether said sensors are loaded with light above or below a border wavelength.

Another further additional feature of the invention resides broadly in an apparatus which is characterized in that as said discriminator in said computing means one window comparator 44; 45; 46 each is provided which comprises two comparators (e.g. 53, 54) of which one each may be preadjusted to an upper border and to a lower border of the activable assessment range and the outputs of which are connected with one another through a logic element 59; 60; 61 for the generation of a monitoring signal (prepared signal) or control signal.

A yet another additional feature of the invention resides broadly in an apparatus which is characterized in that for the monitoring of a plurality of cutting torches 1, 62 through 64 one pair of photoelectric sensors of different spectral sensitivity is provided in each cutting torch, that said pairs of photoelectric sensors are connected through a first multiplexer 69 with inputs of window comparators 44, 45, 46 of different assessment ranges, that said window comparators are connected, at their outputs, with a second multiplexer 72 which includes control inputs for activating the different assessment ranges depending on the external control signals and the output of which is connected to an addressable register 75, which generates control and monitoring signals for the various cutting and monitoring signals for the different cutting torches, and that said multiplexer 69, 72 and said addressable register are synchronized with one another.

Another yet further feature of the invention resides broadly in an apparatus which is characterized in that one sensitivity maximum of one of said two sensors is about 900 nm and one sensitivity maximum of the other of said two sensors is about 600 nm.

An example of a photoelectric sensor can be found in U.S. Pat. No. 4,764,669, entitled "Photoelectric Apparatus for Tracing a Scanning Head Along a Pattern Track with Selectable Sampling."

Examples of flame cutting machines can be found in U.S. Pat. No. 4,735,399, entitled "Method of Operating a Continuous Casting Apparatus and a Casting Flame Cutting Machine for Carrying out the Method"; U.S. Pat. No. 4,602,967, entitled "Method and Apparatus for Thermal Longitudinal Parting of Rectangular Metal Plate Bars, in Particular of Cut-To-Length Continuous-Casting Plate Slabs"; U.S. Pat. No. 4,527,777 entitled "Flame Cutting Machine" U.S. Pat. No. 4,478,393, entitled "Apparatus for Thermal Longitudinal Parting of Rectangular Metal Plate Bars, in Particular of Cut-To-Length Continuous-Casting Plate Slabs"; U.S. Pat. No. 4,475,719, entitled "Flame Cutting Machine"; U.S. Pat. No. 4,466,069, entitled "Flame Cutting Machine with Lost Cut Re-establishment"; U.S. Pat. No. 4,333,635, entitled "Follow-Up Control means in Swinging-Arm Flame-Cutting Machines"; U.S. Pat. No. 4,305,573, entitled "Flame Cutting Machine Control System": U.S. Pat. No. 4,251,205, entitled "Device for Igniting the Fuel Gas of a Flame Cutting Machine"; U.S. Pat. No. 4,202,707, entitled "Flame Cutting Apparatus and Method"; U.S. Pat. No. 4,180,248, entitled "Flame Cutting Machine for Modification of Railway Car Side Sills"; U.S. Pat. No. 4,172,587, entitled "Flame Cutting Machine"; U.S. Pat. No. 4,172,586, entitled "Flame Cutting Machine"; U.S. Pat. No. 4,143,929, entitled "Current Collector" U.S. Pat. No. 4,125,250, entitled "Flame-Cutting Machine"; U.S. Pat. No. 4,111,404, entitled "Flame Cutting Machine for Modification of Railway Car Side Sills"; U.S. Pat. No. 4,003,556, entitled "Flame-Cutting Machine"; U.S. Pat. No. 3,929,324, entitled "Flame Cutting Machine"; U.S. Pat. No. 3,918,480, entitled "Device for Feeding Gases to a Flame Cutting Machine": U.S. Pat. No. 3,912,242, entitled "Flame Cutting Machine" and U.S. Pat. No. 3,866,484, entitled "Rack and Pinion Actuated Machine."

All, or substantially all, of the components and methods of the various embodiments may be used with at least one embodiment or all of the embodiments, if any, described herein.

All of the U.S. patents, U.S. patent applications, and U.S. publications recited herein, if any, are hereby incorporated by reference as if set forth in their entirety herein.

The details in the U.S. patents, U.S. patent applications, and U.S. publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A flame cutting machine for cutting a workpiece comprising:
   a flame generator for generating a flame to cut the workpiece;
   a flame mover in communication with said flame generator for moving said flame about the workpiece;
   a flame controller in communication with said flame generator and said flame mover for controlling said flame, said flame controller including:
   a first sensor for sensing the wavelength of light emitted from at least one of said flame and the workpiece and generating a first signal having a first value corresponding to said wavelength of sensed light, said first signal having a maximum first value when a wavelength of light having a second value is sensed by said first sensor:
   a second sensor for sensing the wavelength of light emitted from at least one of said flame and the workpiece and generating a second signal having a third value corresponding to said wavelength of sensed light, said second signal having a maximum third value when a wavelength of light having a fourth value is sensed by said second sensor, said second value being different from said fourth value; and
   a signal processor in communication with said first sensor and said second sensor for receiving and processing said first value of said first signal and said third value of said second signal and generating a third signal having a fifth value corresponding to the quotient of said first value of said first signal and said third value of said second signal, said third signal for controlling said flame.

2. A controller for a flame cutting machine for cutting a workpiece, said controller comprising:
   a first sensor for sensing the wavelength of light emitted from at least one of the flame and the workpiece and generating a first signal having a first value corresponding to said wavelength of sensed light, said first signal having a maximum first value when a wavelength of light having a second value is sensed by said first sensor;
   a second sensor for sensing the wavelength of light emitted from at least one of the flame and the workpiece and generating a second signal having a third value corresponding to said wavelength of sensed light, said second signal having a maximum third value when a wavelength of light having a fourth value is sensed by said second sensor, said second value being different from said fourth value; and
   a signal processor in communication with said first sensor and said second sensor for receiving and processing said first value of said first signal and said third value of said second signal and generating a third signal having a fifth value corresponding to the quotient of said first value of said first signal and said third value of said second signal, said third signal for controlling the flame.

3. The controller of claim 2, further including a first comparator in communication with said signal processor for comparing said fifth value with a first reference value and a second reference value, said first comparator providing a fourth signal for controlling the flame when said fifth value is greater than said first reference value and less than said second reference value.

4. The controller of claim 3, further including:
   a second comparator in communication with said signal processor for comparing said fifth value with a third reference value and a fourth reference value, said second comparator for providing a fifth signal when said fifth value is greater than said third reference value and less than said fourth reference value;
   a third comparator in communication with said signal processor for comparing said fifth valve with a fifth reference value and a sixth reference value, said third comparator providing a sixth signal when said fifth value is greater than said fifth reference value and less than said sixth reference value;
   wherein said fourth signal controls ignition of the flame;
   wherein said fifth signal controls at least one of preheating and piercing the workpiece; and
   wherein said sixth signal controls the flame cutting of the workpiece.

5. The controller of claim 4, wherein:
   said first value of said first signal is converted by said signal processor to a first logarithmic signal;
   said third value of said second signal is converted by said signal processor to a second logarithmic signal;
   subtractor is provided to subtract said second logarithmic signal from said first logarithmic signal to form said third signal; and
   said third signal corresponding to the quotient of said first value and said second value.

6. The controller of claim 5, wherein:

said first comparator includes a first discriminator for comparing said fifth value with said first reference value;

said first comparator includes a second discriminator for comparing said fifth value with said second reference value;

said second comparator includes a third discriminator for comparing said fifth value with said third reference value;

said second comparator includes a fourth discriminator for comparing said fifth value with said fourth reference value;

said third comparator includes a fifth discriminator for comparing said fifth value with said fifth reference value; and said third comparator includes a sixth discriminator for comparing said fifth value with said sixth reference value.

7. The controller of claim 6, further including;

a first logic element in communication with said first discriminator and said second discriminator for generating said fourth signal when said fifth value is greater than said first reference value and less than said second reference value;

a second logic element in communication with said third discriminator and said fourth discriminator for generating said fifth signal when said fifth value is greater than said third reference value and less than said fourth reference value and a third logic element in communication with said fifth discriminator and said sixth discriminator for generating said sixth signal when said fifth value is greater than said fifth reference value and less than said sixth reference value.

8. The controller of claim 7, wherein said first sensor and said second sensor comprise an opto-double diode.

9. The controller of claim 8, wherein said first sensor and said second sensor are formed on a common substrate.

10. The controller of claim 9, wherein said first sensor has a different spectral sensitivity than said second sensor.

11. The controller of claim 10, wherein:
said first sensor is a germanium diode: and
said second sensor is a silicone diode.

12. The controller of claim 11, wherein:
said first signal assumes said maximum first value when said sensed light has a wavelength of about 600 nanometers; and
said second signal assumes said maximum third value when said sensed light has a wavelength of about 900 nanometers.

13. The controller of claim 7, wherein:
a semi-permeable mirror is relatively positioned with respect to said first sensor and said second sensor;
said semi-permeable mirror allows more light to be passed therethrough than reflected therefrom when the wavelength of light directed on said semi-permeable mirror is greater than a fixed wavelength;
said semi-permeable mirror means allows more light to be reflected therefrom than passed therethrough when the wavelength of light directed on said semi-permeable mirror is less than said fixed wavelength;
light from at least one of said flame and the workpiece is directed on said semi-permeable mirror;
said passed light is directed to said first sensor by said semi-permeable mirror: and
said reflected light is directed to said second sensor by said semi-permeable mirror.

14. The flame cutting machine of claim 13, wherein said fixed wavelength is about 700 nanometers.

15. A controller for controlling the flame of at least first and second flame cutting torches for cutting an object, said controller comprising:

a first sensor for sensing the wavelength of light emitted from at least one of the flame of the first torch and the object, said first sensor generating a first signal having a first value corresponding to said wavelength of sensed light, said first signal having a maximum first value when a wavelength of light having a second value is sensed by said first sensor:

a second sensor for sensing the wavelength of light emitted from at least one of the flame of the first torch and the object, said second sensor generating a second signal having a third value corresponding to said wavelength of sensed light, said second signal having a maximum third value when a wavelength of light having a fourth value is sensed by said second sensor, said second value being different from said fourth value;

a third sensor for sensing the wavelength of light emitted from at least one of the flame of the second torch and the object, said third sensor generating a third signal having a fifth value corresponding to said wavelength of sensed light, said third signal having a maximum fifth value when a wavelength of light having a sixth value is sensed by said third sensor;

a fourth sensor for sensing the wavelength of light emitted from at least one of the flame of the second torch and the object, said fourth sensor generating a fourth signal having a seventh value corresponding to said wavelength of sensed light, said fourth signal having a maximum seventh value when a wavelength of light having an eighth value is sensed by said fourth sensor, said sixth value being different from said eighth value:

a first multiplexer connected to said first, second, third and fourth sensors, said multiplexer for selectively receiving one of: a) both said first and second signals, and b) both said third and fourth signals;

a processor connected to said first multiplexer, said processor for generating first and second processed signals corresponding to one of: a) both said first and second signals, and b) both said third and fourth signals:

a first comparator connected to said processor, said first comparator:
further processing said first and second processed signals into third and fourth processed signals;
comparing said third processed signal to a first reference signal;
generating a first output signal if said third processed signal is greater than said first reference signal;
comparing said fourth processed signal to a second reference signal;
generating a second output signal if said fourth processed
signal is less than said second reference signal; and
generating a first comparator signal if both said first output signal and said second output signal have been generated.

16. The controller of claim 15, further including a second comparator connected to said processor, said second comparator:
further processing said first and second processed signals into fifth and sixth processed signals;
comparing said fifth processed signal to a third reference signal;
generating a third output signal if said fifth processed signal is greater than said third reference signal;
comparing said sixth processed signal to a fourth reference signal;
generating a fourth output signal if said sixth processed signal is less than said fourth reference signal; and
generating a second comparator signal if both said third output signal and said fourth output signal have been generated.

17. The controller of claim 16, further including a second multiplexer connected to said first and second comparators, said second multiplexer for selectively receiving one of said first and second output signals and providing an output thereof.

18. The controller of claim 17, further including a register for receiving said output of said second multiplexer and providing said output of said second multiplexer to one of the first and second flame cutting torches for control thereof.

19. The controller of claim 18, further including:
a clock for synchronously controlling each of said first multiplexer, second multiplexer and said register; and
an address counter at least partially interposed between said clock and said first multiplexer and at least partially interposed between said clock and said register for synchronously controlling said first multiplexer and said register.

20. The controller of claim 2, further including a first comparator in communication with said signal processor for comparing said fifth value with a first reference value, said first comparator providing a fourth signal for controlling the flame when said fifth value is greater than said first reference value and less than said second reference value.

* * * * *